United States Patent
Koya et al.

[11] Patent Number: 5,859,821
[45] Date of Patent: Jan. 12, 1999

[54] RECORD MEDIUM WITH MANAGED DIGEST PORTIONS OF PROGRAMS, REPRODUCING APPARATUS THEREOF, AND REPRODUCING METHOD THEREOF

[75] Inventors: Takashi Koya; Akira Katsuyama, both of Kanagawa, Japan

[73] Assignee: Sony Corporation, Tokyo, Japan

[21] Appl. No.: 739,821

[22] Filed: Oct. 30, 1996

[30] Foreign Application Priority Data

Nov. 2, 1995 [JP] Japan ................................. 7-310080
Aug. 26, 1996 [JP] Japan ................................. 8-242659

[51] Int. Cl.[6] ........................................ G11B 7/00
[52] U.S. Cl. .......................... 369/58; 369/47; 369/275.3
[58] Field of Search ........................... 369/58, 54, 59, 369/47, 48, 49, 32, 275.3

[56] References Cited

U.S. PATENT DOCUMENTS

| | | | |
|---|---|---|---|
| 5,263,010 | 11/1993 | Amemiya et al. | 369/58 X |
| 5,270,877 | 12/1993 | Fukushima et al. | 369/58 X |
| 5,282,186 | 1/1994 | Yoshio et al. | 369/48 |
| 5,319,626 | 6/1994 | Ozaki et al. | 369/58 |
| 5,319,627 | 6/1994 | Shinno et al. | 369/58 X |
| 5,475,668 | 12/1995 | Azumatani et al. | 369/58 |

FOREIGN PATENT DOCUMENTS 58-109886  6/1983  Japan .

*Primary Examiner*—Muhammad N. Edun
*Attorney, Agent, or Firm*—Limbach & Limbach L.L.P.; Seong-Kun Oh

[57] ABSTRACT

According to the present invention, since a management region for managing record positions of impressive or feature portions (as digests) of programs recorded on a record medium is provided, an outline of the programs on the record medium can be obtained. In addition, since the priority of programs designated as digests is also managed with the management region, a portion representative of a program representative of an album can be reproduced.

13 Claims, 26 Drawing Sheets

Fig. 5

| | P | Q | R | S | T | U | V | W |
|---|---|---|---|---|---|---|---|---|
| FRAME F01 | | | | S0 | | | | |
| F02 | | | | S1 | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

137

S0=00100000000001
S1=0000000000010010

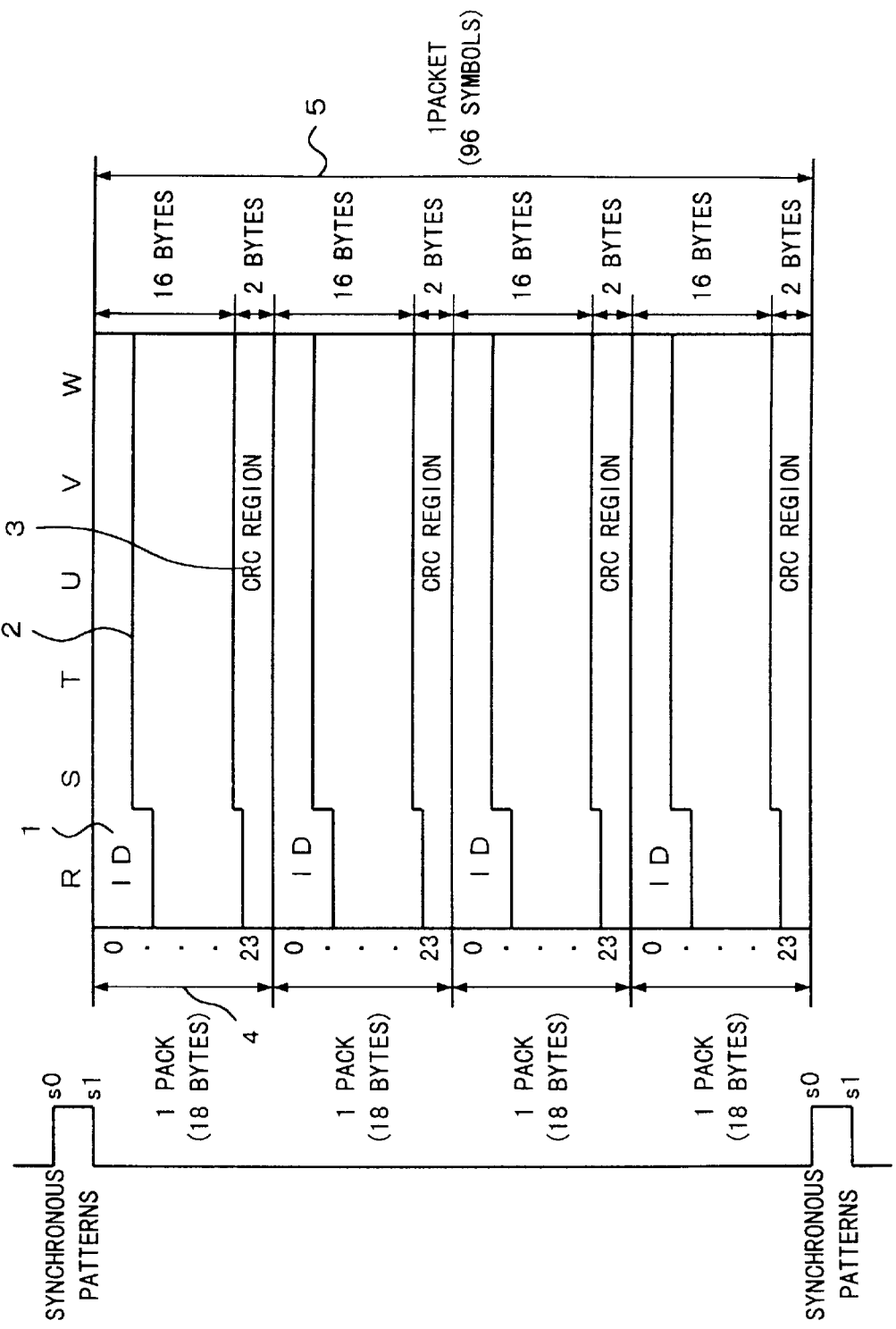

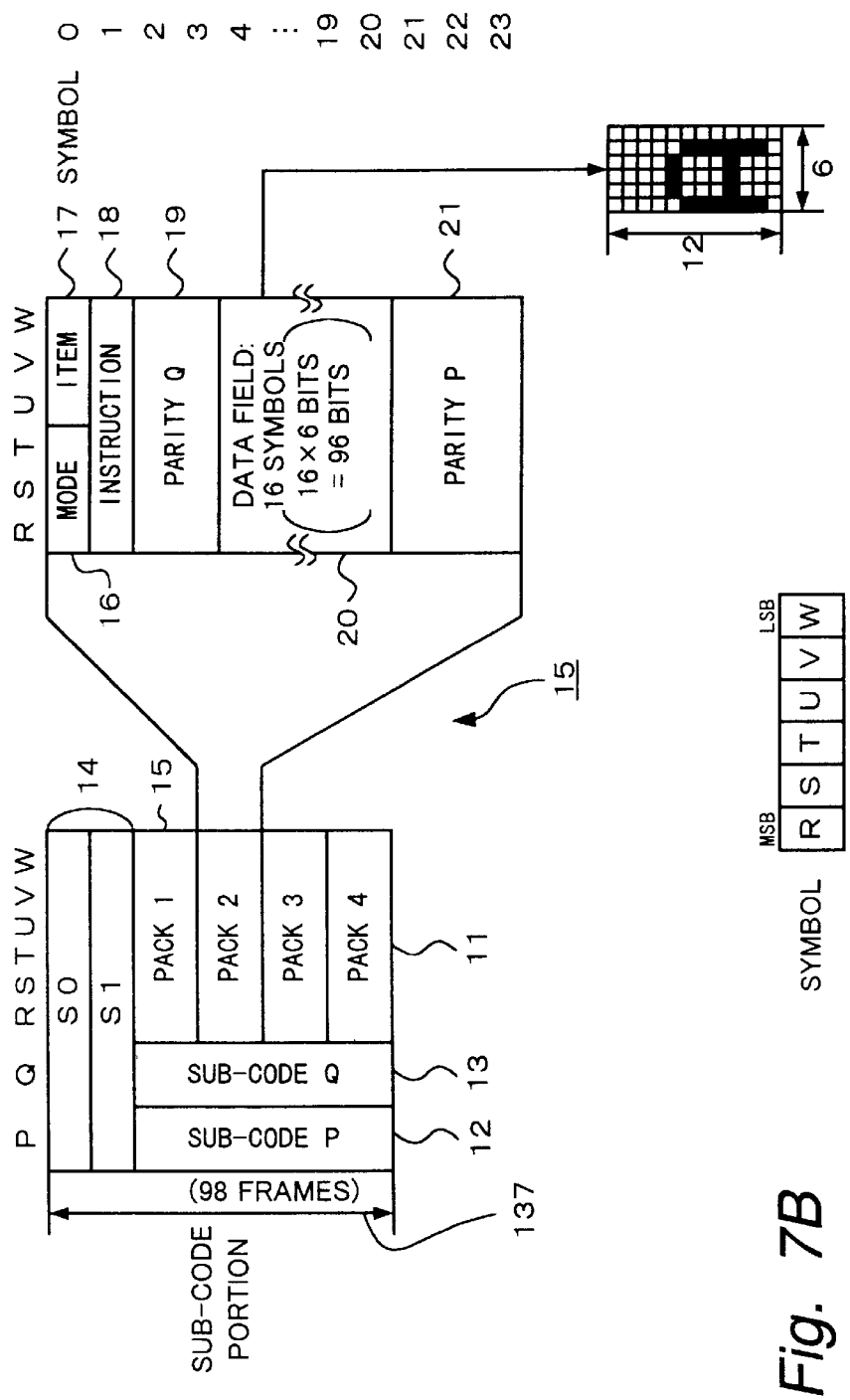

ITEM
80h = ALBUM NAME/PROGRAM NAME
81h = NAME OF PERFORMER, NAME OF
      CONDUCTOR, OR NAME OF ORCHESTRA
82h = WRITER
83h = COMPOSER
84h = ARRANGER
85h = MESSAGE
86h = DISC ID
87h = SEARCH KEYWORD
88h = TOC
89h = 2ndTOC
8ah = USER (T.B.D.)
8bh = TEXT (T.B.D.)
8ch = TEXT 2 (T.B.D.)
8dh = RESERVED
8eh = RESERVED
8fh = SIZE

Track No( 1 to 99  00h to 63h)

SERIAL NUMBER IN BLOCK RANGING 00 TO 255 ( 0 TO FFh)

Fig. 15A

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 80 | 00 | 00 | 00 | B | E | A | T | L | E | S | SP | T | H | E | SP | |
| ALBUM NAME SERIAL NO. | | | ASCII n=0 | 0 | 1 | 2 | 3 | 4 | 5 | 6 | 7 | 8 | 9 | 10 | 11 | |

ALBUM NAME (DISC TITLE NAME)

Fig. 15B

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 80 | 00 | 01 | 0C | B | E | S | T | 00 | L | O | V | E | SP | M | E | |
| ALBUM NAME SERIAL NO. | | | ASCII n=12 | 12 | 13 | 14 | 15 | DELIMITED WITH NULL | 0 | 1 | 2 | 3 | 4 | 5 | 6 | |

FIRST PROGRAM

Fig. 15C

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 80 | 01 | 02 | 07 | SP | D | O | 00 | T | H | E | SP | W | A | V | E | |
| FIRST PROGRAM SERIAL NO. | | | ASCII n=7 | 7 | 8 | 9 | DELIMITED WITH NULL | 0 | 1 | 2 | 3 | 4 | 5 | 6 | 7 | |

SECOND PROGRAM

Fig. 15D

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 80 | 03 | 03 | 00 | P | L | E | A | S | E | SP | H | E | L | P | 00 | |
| THIRD PROGRAM SERIAL NO. | | | ASCII n=0 | 0 | 1 | 2 | 3 | 4 | 5 | 6 | 7 | 8 | 9 | 10 | DELIMITED WITH NULL | |

THIRD PROGRAM

Fig. 17A

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 81 | 00 | 10 | 00 | M | I | C | H | A | E | L | SP | J | A | C | K | |
| NAME OF PERFORMER REPRESENTATIVE OF ALBUM | | | SERIAL NO. | ASCII n = 0 | 0 | 1 | 2 | 3 | 4 | 5 | 6 | 7 | 8 | 9 | 10 | 11 | |

NAME OF PERFORMER REPRESENTATIVE OF ALBUM

Fig. 17B

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 81 | 00 | 11 | 0C | S | O | N | 00 | J | A | N | E | T | SP | J | A | |
| NAME OF PERFORMER REPRESENTATIVE OF ALBUM | | | SERIAL NO. | ASCII n = 12 | 12 | 13 | 14 | DELIMITED WITH NULL | 0 | 1 | 2 | 3 | 4 | 5 | 6 | 7 | |

NAME OF PERFORMER OF FIRST PROGRAM

Fig. 17C

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 81 | 01 | 12 | 07 | C | K | S | O | N | 00 | M | . | J | A | C | K | |
| NAME OF PERFORMER OF FIRST PROGRAM | | | SERIAL NO. | ASCII n = 8 | 8 | 9 | 10 | 11 | 12 | DELIMITED WITH NULL | 0 | 1 | 2 | 3 | 4 | 5 | |

NAME OF PERFORMER OF SECOND PROGRAM

Fig. 19A

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 85 | 00 | 20 | 00 | T | h | a | n | k | sp | Y | o | u | sp | V | e | |
| | | | | 0 | 1 | 2 | 3 | 4 | 5 | 6 | 7 | 8 | 9 | 10 | 11 | |

REPRESENTATIVE OF DISC SERIAL NO. ASCII n = 0
ALBUM NAME (DISC TITLE NAME)

Fig. 19B

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 85 | 00 | 21 | 0C | r | y | sp | m | u | c | h | sp | P | l | e | a | |
| | | | | 12 | 13 | 14 | 15 | 16 | 17 | 18 | 19 | 20 | 21 | 22 | 23 | |

REPRESENTATIVE OF DISC SERIAL NO. ASCII n = 12

Fig. 19C

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 85 | 00 | 22 | 07 | e | sp | E | n | j | o | y | SP | 00 | 00 | 00 | 00 | |
| | | | | 24 | 25 | 26 | 27 | 28 | 29 | 30 | 31 | | | | | |

REPRESENTATIVE OF DISC SERIAL NO. ASCII n ≧ 15
DELIMITED WITH NULL

Fig. 19D

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 85 | 0f | 23 | 00 | S | e | e | sp | Y | o | u | sp | B | y | e | 00 | |
| | | | | 0 | 1 | 2 | 3 | 4 | 5 | 6 | 7 | 8 | 9 | 10 | | |

15th PROGRAM NO. SERIAL NO. ASCII n = 0
15th PROGRAM
DELIMITED WITH NULL

Fig. 23A

| ID1 | ID2 | ID3 | ID4 | text1 | text2 | text3 | text4 | CRC |
|---|---|---|---|---|---|---|---|---|
| 88h | 00 RESERVED | SERIAL NUMBER | CURRENT BLOCK NUMBER | A0 FIRST TRACK | A1 LAST TRACK | 00h RESERVED | MINUTE OF READ-OUT | |

| text5 | text6 | text7 | text8 | text9 | text10 | text11 | text12 |
|---|---|---|---|---|---|---|---|
| SECOND OF READ-OUT | FRAME OF READ-OUT | 00h RESERVED | 00h RESERVED | 00h RESERVED | 00h RESERVED | 00h RESERVED | 00h RESERVED |

Fig. 23B

| ID1 | ID2 | ID3 | ID4 | text1 | text2 | text3 | text4 | CRC |
|---|---|---|---|---|---|---|---|---|
| 88h | FIRST TRACK NUMBER | SERIAL NUMBER | CURRENT BLOCK NUMBER | MINUTE OF FIRST TRACK | SECOND | FRAME | MINUTE OF FIRST TRACK + 1 | |

| text5 | text6 | text7 | text8 | text9 | text10 | text11 | text12 |
|---|---|---|---|---|---|---|---|
| SECOND | FRAME | MINUTE OF FIRST TRACK + 2 | SECOND | FRAME | MINUTE OF FIRST TRACK + 3 | SECOND | FRAME |

Fig. 24

| ID1 | ID2 | ID3 | ID4 | text1 | text2 | text3 | text4 |
|---|---|---|---|---|---|---|---|
| 89h | TRACK NUMBER | SERIAL NUMBER | CURRENT BLOCK NUMBER | PRIORITY NUMBER | TOTAL NUMBER OF POINTS | 00h RESERVED | 00h RESERVED |
| text5 | text6 | text7 | text8 | text9 | text10 | text11 | text12 |
| 00h RESERVED | 00h RESERVED | MINUTE OF START | SECOND OF START | FRAME OF START | MINUTE OF END | SECOND OF END | FRAME OF END |
| CRC | | | | | | | |

Fig. 26A

| ID1 | ID2 | ID3 | ID4 | text1 | text2 | text3 | text4 | CRC |
|---|---|---|---|---|---|---|---|---|
| 8fh | 00 RESERVED | SERIAL NUMBER | CURRENT BLOCK NUMBER | TOTAL NUMBER OF BLOCKS | NUMBER OF PACKS OF CURRENT BLOCK | TOTAL NUMBER OF PACKS OF ALL BLOCKS | | |

| text5 | text6 | text7 | text8 | text9 | text10 | text11 | text12 |
|---|---|---|---|---|---|---|---|
| LANGUAGE CODE | COPY CONTROL FLAG | FIRST TRACK NUMBER | LAST TRACK NUMBER | TOTAL NUMBER OF PACKS 8fh | TOTAL NUMBER OF PACKS 80h | TOTAL NUMBER OF PACKS 81h | TOTAL NUMBER OF PACKS 82h |

Fig. 26B

| ID1 | ID2 | ID3 | ID4 | text1 | text2 | text3 | text4 | CRC |
|---|---|---|---|---|---|---|---|---|
| 8fh | 01 RESERVED | SERIAL NUMBER | CURRENT BLOCK NUMBER | TOTAL NUMBER OF PACKS 83h | TOTAL NUMBER OF PACKS 84h | TOTAL NUMBER OF PACKS 85h | TOTAL NUMBER OF PACKS 86h | |

| text5 | text6 | text7 | text8 | text9 | text10 | text11 | text12 |
|---|---|---|---|---|---|---|---|
| TOTAL NUMBER OF PACKS 87h | TOTAL NUMBER OF PACKS 88h | TOTAL NUMBER OF PACKS 89h | TOTAL NUMBER OF PACKS 8Ah | TOTAL NUMBER OF PACKS 8Bh | TOTAL NUMBER OF PACKS 8Ch | TOTAL NUMBER OF PACKS 8Dh | TOTAL NUMBER OF PACKS 8Eh |

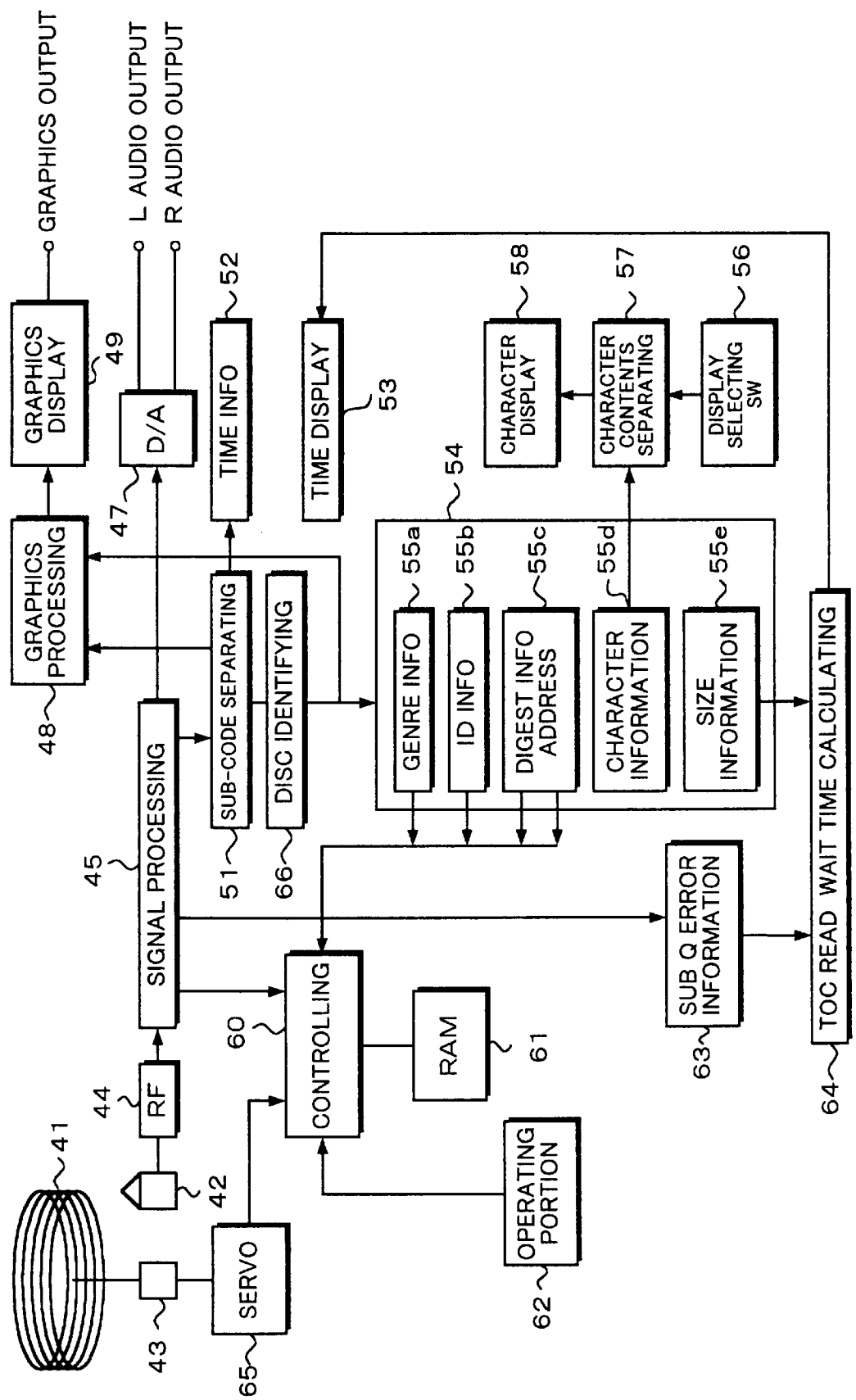

RECORD MEDIUM WITH MANAGED DIGEST PORTIONS OF PROGRAMS, REPRODUCING APPARATUS THEREOF, AND REPRODUCING METHOD THEREOF

BACKGROUND OF THE INVENTION

1. Field of the Invention

The present invention relates to a record medium such as a digital audio compact disc with a subcode in association with main digital data such as audio data and visual data, a reproducing apparatus thereof, and a reproducing method thereof.

2. Description of the Related Art

In a CD (compact disc) reproducing apparatus that reproduces audio information from a CD, various types of data are displayed corresponding to information reproduced from the disc so as to improve the operability of the apparatus. As an example of the data, a program number (so-called track number) and time information assigned thereto are displayed. Such information is recorded to a sub-code of channel Q (that will be described later).

As shown in FIG. 1, a CD 101 has a hole 102 at the center thereof. A read-in region 103, a program region 104, and a read-out region 105 are successively formed around the hole 102. The read-in region 103 is a program management region in which TOC (Table of Contents) data is recorded. In the program region 104, program data is recorded. The read-out region 105 is a program end region. Audio data is recorded in the program region 104 of the audio CD. Time information and so forth of the audio data are managed in the read-in region 103. When audio data has been completely read from the program region 104 and a pickup of the apparatus has reached the read-out region 105, the CD reproducing apparatus completes the reproducing operation of the CD.

FIG. 2 is a block diagram showing an example of the structure of the CD reproducing apparatus. The CD reproducing apparatus reads audio data from the CD 101 with a pickup 112. A digital signal processing circuit 116 processes the audio signal and outputs reproduced data to a digital signal output terminal 125 or analog signal output terminal L and R.

The pickup 112 has an optical device (such as an objective lens), a semiconductor laser, a four-divided detector (that receives rays reflected by the CD 101), and so forth. When an output signal of the four-divided detector is calculated, an RF signal, a focus error signal, and a tracking error signal are formed. The RF signal is supplied to an analog waveform shaping circuit 114. The focus error signal is supplied to a focus servo circuit 120. The tracking error signal is supplied to a tracking and thread servo circuit 121.

The analog waveform shaping circuit 114 shapes the waveform of the RF signal received from the pickup 112 and supplies the resultant signal to a synchronous detecting circuit 115 and a clock signal generating circuit 117. The clock generating circuit 117 generates a reproduced clock signal that corresponds to the RF signal received from the analog waveform shaping circuit 114 and that synchronizes with the RF signal. The clock signal generating circuit 117 supplies the reproduced clock signal to the synchronous detecting circuit 115, the digital signal processing circuit 116, and a rotation servo circuit 122. The synchronous detecting circuit 115 detects a frame synchronous pattern from the RF signal corresponding to the reproduced clock signal received from the clock signal generating circuit 117.

The synchronous detecting circuit 115 supplies the detected signal of the frame synchronous pattern to the digital signal processing circuit 116.

The digital signal processing circuit 116 performs a reproducing process for the RF signal received through the synchronous detecting circuit 115. In reality, the digital signal processing circuit 116 performs an EFM demodulating (Eight-Fourteen Demodulating) process, an error-correction-code decoding process, an error interpolating process, and so forth. To perform these processes, the digital signal processing circuit 116 uses the reproduced clock signal received from the clock signal generating circuit 117 and a reference clock signal received from a crystal oscillator 119. A digital audio signal of left and right channels is supplied from the digital signal processing circuit 116 to the digital output terminal 125. In addition, the digital audio signal is supplied to a D/A converter 123. The D/A converter 123 converts a digital signal into an analog signal. An audio amplifier 124 amplifies the analog audio signal received from the D/A converter 123 and outputs the amplified analog signal to the analog signal output terminals R and L.

The digital signal processing circuit 116 is connected to a sub-code detecting circuit 118. The sub-code detecting circuit 118 detects data of channels P and Q of a sub-code from the digital signal received from the digital signal processing circuit 116. A microprocessor 126 detects time information from the detected data of channels P and Q and controls the tracking and thread servo circuit 121 corresponding to the detected timing information.

A focus drive signal is supplied from the focus servo circuit 120 to the pickup 112. The focus servo circuit 120 performs a focus servo operation for the pickup 112 so that the focus position of the objective lens of the pickup 112 accords with the signal side of the CD 101. The rotation servo circuit 122 generates a rotation drive control signal corresponding to the reproduced clock signal received from the clock signal generating circuit 117 and the reference clock signal received from the crystal oscillator 119. The rotation servo circuit 122 supplies the rotation drive control signal to a spindle motor 113 so as to control the rotating operation of the spindle motor 113.

The tracking and thread servo circuit 121 generates a tracking control and drive signal corresponding to the tracking error signal received from the pickup 112 and supplies the tracking control and drive signal to the pickup 112 so as to control the tracking operation of the pickup 112. In addition, the tracking and thread servo circuit 121 generates a control signal for driving a moving unit that moves the pickup 112 in the radial direction of the CD 101. The microprocessor 126 generates a track position control signal corresponding to for example data of channels P and Q and supplies the signal to the tracking and thread servo circuit 121 so as to move the pickup 112. The tracking and thread servo circuit 121 controls the track position of the pickup 112 corresponding to for example an access command.

Next, a sub-code and data of channels P and Q will be described. A signal recorded on the CD is sampled at a sampling frequency of 44.1 kHz of which one sample or one word is composed of 16 bits. Each sample or word composed of 16 bits is divided into high order eight bits and low order eight bits as symbols. The error-correction-code encoding process and the interleaving process are performed for each symbol. Every 24 symbols of audio data are grouped as one frame. One frame is equivalent to six samples of each of left and right channels.

In the EFM modulating process, eight bits of each symbol are converted into 14 bits. FIG. 3 shows a data structure of one frame that has been EFM modulated. One frame 135 is composed of a synchronous pattern data region 131 of 24 channel bits, a sub-code region 132 of 14 channel bits, a program data region 133 of 12 symbols including program data D1 to D12, a parity data region 134 of 4 symbols including parity data P1 to P4, and other program regions 133 and 134. Each region or data portion is connected with three channel bits as connection bits. Thus, one frame 135 has a total of 588 channel bits.

FIG. 4 shows an arrangement of which individual regions and data portion of 98 frames are vertically and successively disposed. The interval of 98 frames shown in FIG. 4 is equivalent to a block of which a sub-code is completed. Thus, a block of 98 frames is referred to as a sub-code frame. The sub-code frame is composed of a frame synchronous pattern portion 136, a sub-code portion 137, and a data and parity portion 138. One sub-code frame is equivalent to 1/75 second of the reproducing time of a CD.

Sub-code data including data of channels P and Q supplied from the sub-code detecting circuit 118 shown in FIG. 2 is data recorded in the sub-code portion 137 shown in FIG. 4. FIG. 5 shows a detailed data structure of the sub-code frame in the sub-code portion 137. First two frames F01 and F02 are synchronous patterns S0 and S1 of the sub-code frame. As with the frame synchronous patterns, the synchronous patterns S0 and S1 are out-of-rule patterns of the EFM modulating process. The sub-code detecting circuit 118 shown in FIG. 2 detects the synchronous patterns S0 and S1 as a delimiter of a sub-code frame. In addition, eight bits of one symbol compose data of channels P to W of the sub-code. For example, data of channel P is composed of parts of S0 and S1 and P01 to P96.

The data of channel P of the sub-code has information that represents whether or not a program is present. The data of channel Q has absolute time information of the CD, time information of each program, and information of each program number (also referred to as track number), each program part number (also referred to as index number), and so forth. Thus, with the information of channel Q, a reproducing operation including, for example a program start position detecting operation can be controlled. In addition, with the information of channel Q displayed, the user can visually know what program number the current program has on the CD, the running time of the program, the absolute time, and so forth. In addition, data of six channels R to W of the sub-code is used for still pictures and texts of programs. A reproducing apparatus using data of channels R to W is referred to as a CD-graphics. The apparatus has been disclosed in for example U.S. Pat. No. 5,282,186.

To improve the operability of the CD reproducing apparatus, a function for browsing the contents of the CD is known. As an example of such a function, the top portion (for example, 15 seconds) of each program is successively reproduced. In commercially available CD players, such a function is called intro-scanning function or music-scanning function. With such a function, the user can quickly know the contents of programs recorded on the CD. Such a CD player has been disclosed as Japanese Utility Patent Laid-Open Publication No. 58-109886 (laid-open on Jul. 26, 1983).

The intro-scanning mode is accomplished using TOC data of the CD. As the TOC data, the start address of each program, the end address thereof, the first program number, the last program number, and so forth are recorded in the program management region (the read-in region 103) of the CD shown in FIG. 1. When the CD is loaded, the TOC data is read by the reproducing apparatus. The TOC data is stored in the memory of the apparatus. The pickup is moved to the start address of a program designated corresponding to the TOC data and the reproducing operation is performed for a predetermined time period (for example, 15 seconds). By repeating the pickup moving operation and the reproducing operation, the intro-scanning function is accomplished. However, this function is used for reproducing only the start portion of each program. Thus, the user cannot know the contents or features of each program.

OBJECTS AND SUMMARY OF THE INVENTION

Therefore, an object of the present invention is to provide a record medium that records information of an impressive or feature portion (namely, a highlight or climax portion) of each program as a digest information. The digest information has the start address and end address of the impressive or feature portion of each program. With the digest information, the impressive or feature portion of each program can be successively reproduced.

Another object of the present invention is to provide a record medium and a reproducing apparatus that allow impressive or feature portions to be successively reproduced corresponding to a priority being designated so that the user can easily know audio/visual information recorded on the record medium such as a CD.

The present invention is a record medium, comprising a program region in which at least one program has been recorded, and a management region in which management information has been recorded, the management information managing the number of programs recorded in the program region, the record positions of the programs, and the position of a digest information of at least one program recorded in the program region.

The present invention is a reproducing apparatus for reproducing data from a record medium having a program region in which at least one program has been recorded and a management region in which management information has been recorded, the management information managing the number of programs recorded in the program region, the record positions of the programs, and the position of a digest information of at least one program recorded in the program region, the reproducing apparatus comprising a reproducing means for reproducing the management information and the program recorded on the record medium, an extracting means for extracting position information of a digest information of the program from the management information reproduced by the reproducing means, an operating means for designating a digest reproduction, and a controlling means for controlling the reproducing means so as to successively reproduce programs recorded in the program region corresponding to the position information extracted from the extracting means when the operating means designates the digest reproduction.

The above, and other, objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a schematic diagram showing a data structure of individual channels of the sub-code frame;

FIG. 6 is a schematic diagram showing a plurality of packs into which channels R to W of the sub-code frame shown in FIG. 5 are divided;

FIG. 7A is a schematic diagram showing a simplified structure of FIG. 6 including synchronous signals portions S0 and S1 and channels P and Q;

FIG. 7B is a schematic diagram showing a detailed data structure of each pack;

FIG. 7C is a schematic diagram showing character data that is actually recorded in the data field of the pack;

FIG. 15A is a schematic diagram showing a practical data structure in the case that an album title is assigned to the ID1 as an identifier;

FIG. 15B is a schematic diagram showing a practical data structure in the case that an album title is assigned to the ID1 as an identifier;

FIG. 15C is a schematic diagram showing a practical data structure in the case that an album title is assigned to the ID1 as an identifier;

FIG. 15D is a schematic diagram showing a practical data structure in the case that an album title is assigned to the ID1 as an identifier;

FIG. 17A is a schematic diagram showing a practical data structure in the case that a performer is assigned to the ID1 as an identifier;

FIG. 17B is a schematic diagram showing a practical data structure in the case that a performer is assigned to the ID1 as an identifier;

FIG. 17C is a schematic diagram showing a practical data structure in the case that a performer is assigned to the ID1 as an identifier;

FIG. 19A is a schematic diagram showing a practical data structure in the case that a message is assigned to the ID1 as an identifier;

FIG. 19B is a schematic diagram showing a practical data structure in the case that a message is assigned to the ID1 as an identifier;

FIG. 19C is a schematic diagram showing a practical data structure in the case that a message is assigned to the ID1 as an identifier;

FIG. 19D is a schematic diagram showing a practical data structure in the case that a message is assigned to the ID1 as an identifier;

FIG. 23A is a schematic diagram showing a practical data structure in the case that a conventional TOC is assigned to the ID1 as an identifier;

FIG. 23B is a schematic diagram showing a practical data structure in the case that a conventional TOC is assigned to the ID1 as an identifier;

FIG. 24 is a schematic diagram showing the contents of data in the case that a digest reproduction is assigned to the ID1 as an identifier;

FIG. 26A is a schematic diagram showing a practical data structure in the case that a size pack is assigned to the ID1 as an identifier;

FIG. 26B is a schematic diagram showing a practical data structure in the case that a size pack is assigned to the ID1 as an identifier;

FIG. 27 is a block diagram showing a structure for accomplishing a digest reproduction according to the present invention.

DETAILED DESCRIPTION OF THE PREFERRED EMBODIMENT

Figure 1:
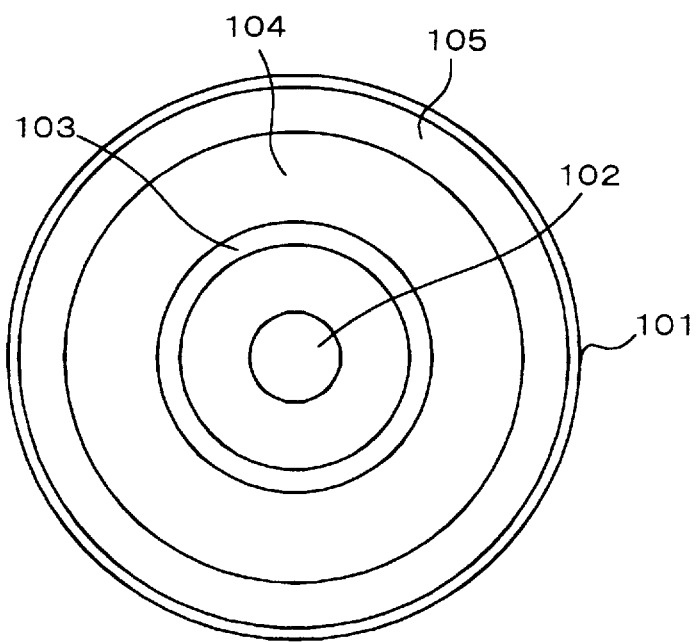
FIG. 1 is a schematic diagram showing a conventional disc shaped record medium.
Figure 2:
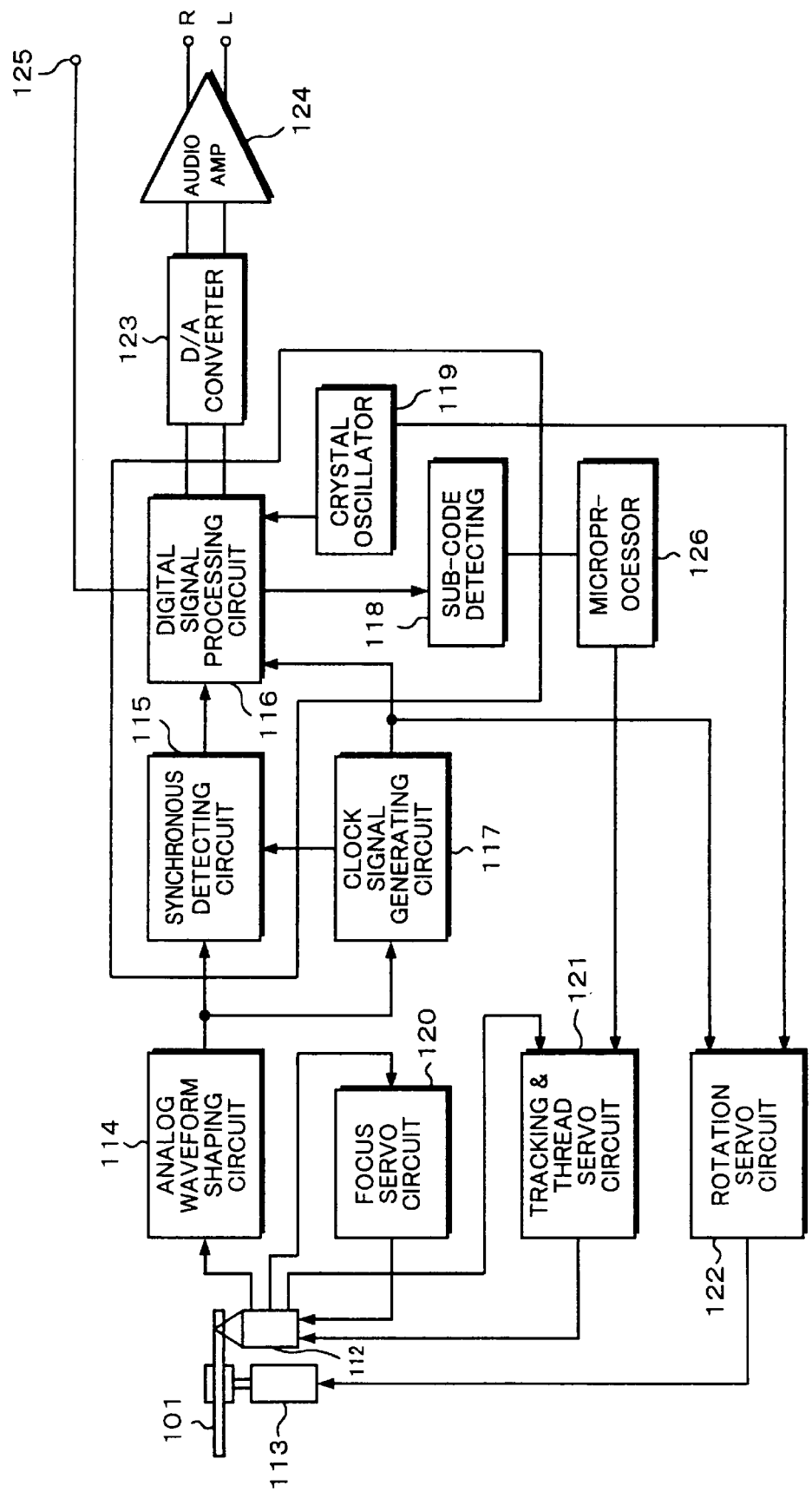
FIG. 2 is a block diagram showing a conventional optical disc apparatus.
Figure 3:
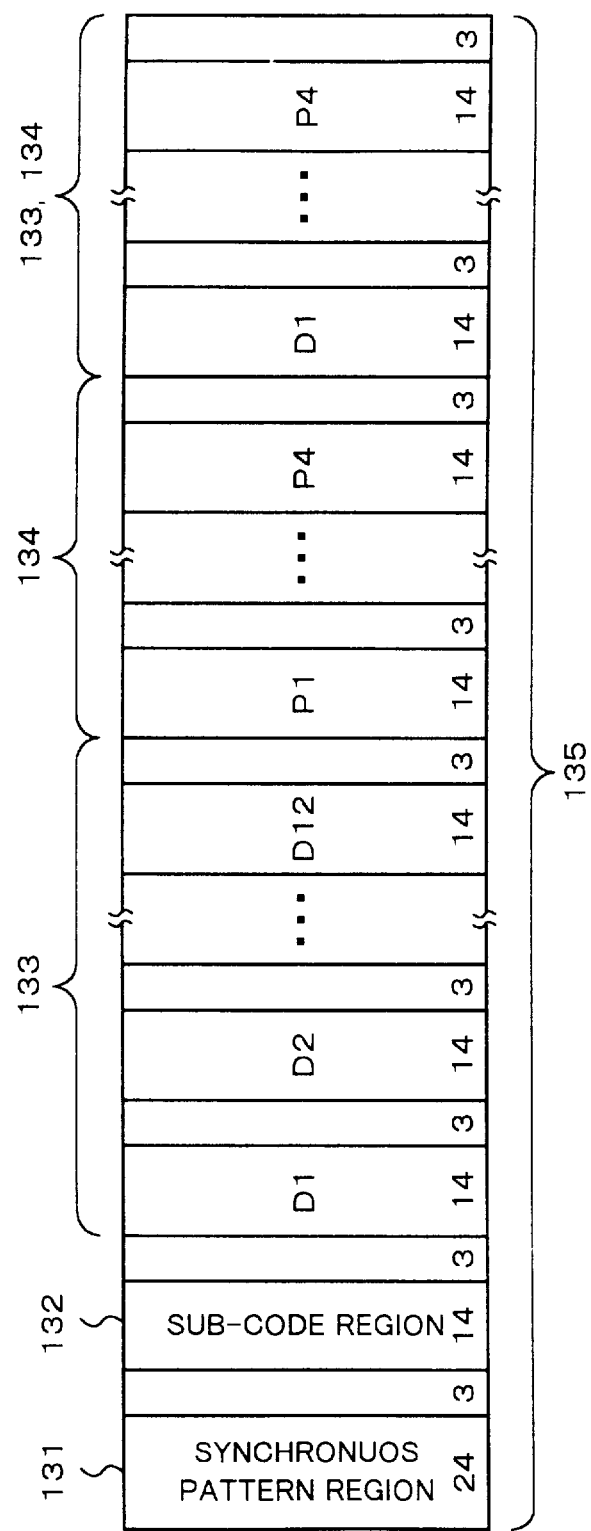
FIG. 3 is a schematic diagram showing a data structure of a frame recorded on the disc shaped record medium shown in FIG. 1.
Figure 4:
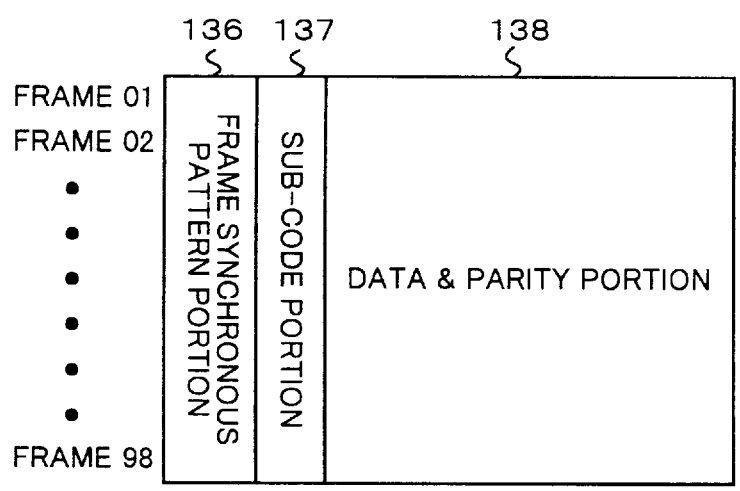
FIG. 4 is a schematic diagram showing a data structure of a sub-code frame composed of 98 frames (each frame is shown in FIG. 3)

Next, with reference to the accompanying drawings, an embodiment of the present invention will be described. In the embodiment, a CD is used as a record medium. However, it should be noted that the present invention can be also applied for other types of optical discs (for example, a DVD (Digital Video Disc)), a magnetic tape, and a semiconductor memory, and so forth. In addition, information recorded on a record medium is not limited to audio data, but may also include video data and so forth.

FIG. 6 is a schematic diagram showing a structure of TOC data recorded in the program region of a CD. In a conventional CD, with 72-bit data of one frame of the sub-code of channel Q, the total number of programs and record positions thereof are managed. In reality, with the 72-bit data, program numbers ranging from 00 to 99, the start address (absolute time) of each program, the first program number, the last program number, and the address of the read-out are recorded. In addition to the sub-code of channel Q, data of channels R to W as shown in FIG. 6 is recorded as TOC data.

The first two frames of the data of channels R to W are synchronous patterns S0 and S1. The remaining data includes 96 symbols, each of which is composed of six bits. The 96 symbols are divided into four groups, each of which is composed of 24 symbols. Each group is referred to as one pack. Four packs are referred to as one packet.

At the first position of each pack, an ID region 1 is disposed. The ID region 1 has mode information for designating a record mode of information recorded to the pack and a 24-bit ID code including other identification information (ID2, ID3, and ID4). The ID region 1 is followed by a text region 2 in which text information associated with main data is recorded as a multiple of eight bits. The text region 2 is followed by a CRC (Cyclic Redundancy Code) region 3. In the CRC region 3, 16-bit data for detecting an error with a CRC code is recorded.

Before explaining sub-codes of channels R to W, a data format in which conventional graphic information is recorded on a CD will be described. FIG. 7A is a schematic diagram showing the structure of the sub-code portion 137 shown in FIG. 5. A sub-code is composed of eight bits. A bit group that composed the sub-code is divided into eight channels P, Q, R, S, T, U, V, and W. The sub-code portion 137 is composed of 98 frames of data of channels P to W.

The first two frames S0 and S1 are synchronous patterns. The third to 98-th frames include a block 12, a block 13, and a block 11. The block 12 is composed of only data of channel P and is referred to as a sub-code P. The block 13 is composed of only data of channel Q and is referred to as a sub code Q. The block 11 is composed of only data of channels R to W.

In the system for recording and reproducing visual information as sub-codes, as shown in FIG. 7B, one symbol is composed of six bits of channels R to W. The minimum unit of data is referred to as a pack composed of 24 symbols 0 to 23. In other words, the block 11 is divided into four packs. The high order three digits and the low order three digits of the first symbol of 24 symbols that compose a pack represent a mode and an item, respectively. The mode and the item are represented by a symbol 0. A symbol 1 that precedes the symbol 0 is an instruction that represents the type of a command. The instruction is followed by symbols 3 and 4 that compose a parity Q as an error correction code. The parity Q is followed by symbols 4 to 19 that compose a data field including color information and so forth. The data field is followed by the symbols 20 to 23 that compose a parity P as an error correction code for protecting information in the pack.

There are four types of modes including a zero mode, a line graphics mode, a TV graphics mode, and a user mode. For example, in the zero mode, no operation is performed for the display screen. In other words, the zero mode is used when a picture is kept unchanged. In this mode, data in the pack is all zero. Also the line graphics mode is used to display a description of a program on a liquid crystal display that is connected to the player.

There are several image processing commands that are a paint command, a picture drawing command (of which a picture is drawn with a font in two colors), a screen shifting command (of which the entire screen is vertically or horizontally shifted), and so forth.

When character data is displayed with CD graphics, the data field is normally treated as dot data. For example, character "A" is represented by painting predetermined dots of 6×12 dots as shown in FIG. 7C.

As described above, in the conventional method of which graphics information is inserted into sub-codes (namely, CD graphics), to process data of channels R to W, a dedicated processing circuit is required. In addition, since the error correcting method using the parity P and parity Q is complicated, the processing circuit is inevitably complicated. Thus, the conventional method is not proper for an application of which text information is recorded and reproduced with sub-codes of channels R to W.

Figure 8A:
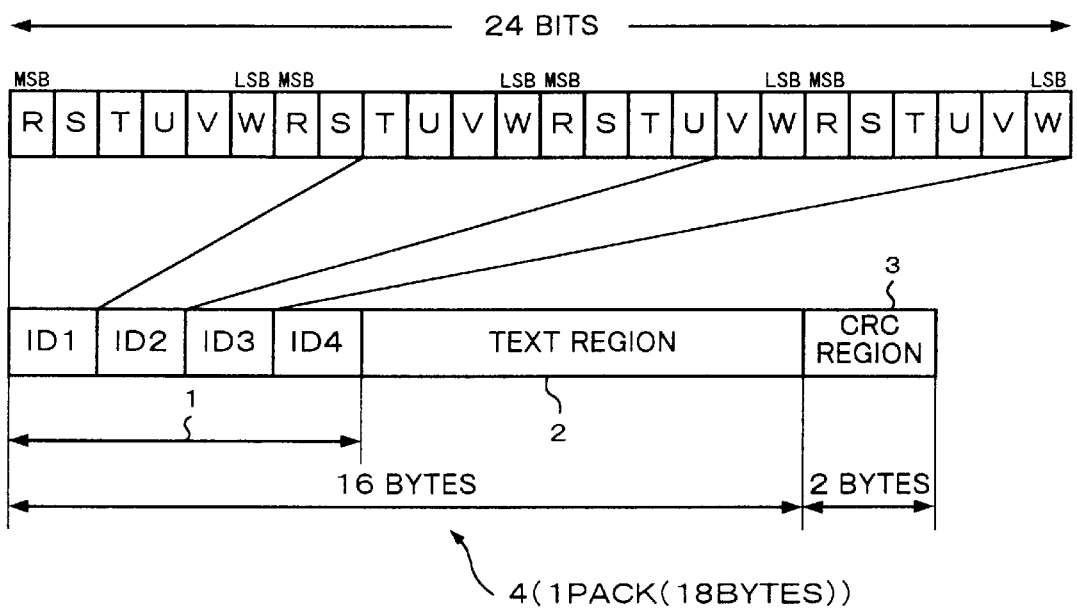
FIG. 8A is a schematic diagram showing a data format of which data of channels R to W is sequentially disposed.

To solve this problem, according to the embodiment of the present invention, the sub-codes of channels R to W can be used with a simpler processing circuit than the related art reference. FIG. 8A is a schematic diagram showing a data format of serial data of channels R to W shown in FIG. 6. As shown in FIG. 8A, the first 32-bit data (only a 24-bit portion is shown in the drawing) is divided into four groups as bytes. These groups are designated as byte identifications ID1, ID2, ID3, and ID4. Thus, an ID region 1 is formed. The ID region 1 is followed by a text region 2. The text region 2 is also divided into groups as bytes. Thus, since sub-codes of channels R to W can be processed with the processing method for a signal of channel Q, the processing circuit becomes simple.

Figure 8B:
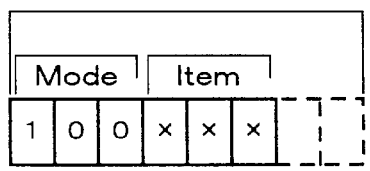
FIG. 8B is a schematic diagram showing a data structure of an ID.

In the data format shown in FIG. 8B, an error-correction-code encoding process using the parity P and parity Q is used. On the other hand, in the data format according to the embodiment of the present invention, an error-correction-code encoding process is performed with a CRC code. When an error is detected, data is read again. Thus, data is written four times for each pack in the TOC. In addition, a data sequence for each packet is repeatedly recorded. In such a multiplexing recording process, a complicated circuit necessary for the error correcting process can be omitted.

It should be noted that the number of times the writing process is performed is not limited to four. In addition, the unit of the writing process is not limited to a pack. Instead, data of every packet or data of every several packets may be repeatedly written.

As shown in FIG. 8B, the ID1 at the beginning of the ID region 1 is composed of eight bits that is larger than the conventional symbol by two bits. In addition, to prevent the CD reproducing apparatus that has the function for decoding the sub-codes of channels R to W from malfunctioning, the same data as the above-described mode is written to the high order three bits. As a mode represented with the three bits, an undefined code (for example, mode 4 ("100")) is assigned. Thus, even if the CD is loaded to the conventional reproducing apparatus, since a recognizable mode is not detected, the reproducing apparatus only steps, not malfunctions. As other undefined modes, there are modes 5 and 6. Instead of the mode 4, one of these modes can be used.

Figure 9:
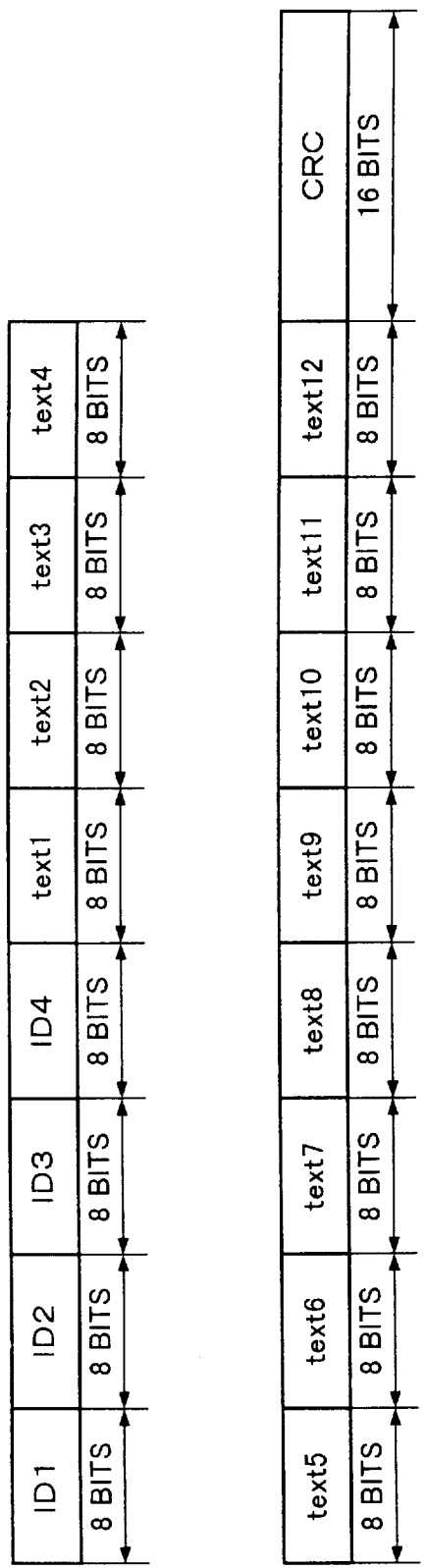
FIG. 9 is a schematic diagram showing an assignment of data in a data format.

In the embodiment of the present invention of which the mode 4 is designated by the ID1, the data format of the pack includes ID1, ID2, ID3, ID4, text bytes text1 to txt12 (that are delimited by eight bits (one byte)), and a 12-bit CRC code as shown in FIG. 9.

Figure 10:
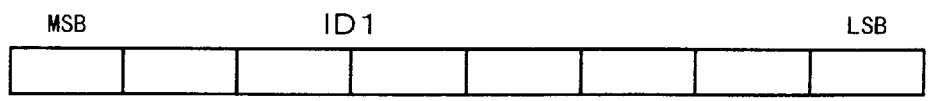
FIG. 10 is a schematic diagram showing types of identifiers recorded in an ID1.

The ID1 is composed of eight bits. FIG. 10 defines the contents of data of the ID1 of the pack. As described above, the ID1 is denoted by 8xh (where h represents hexadecimal notation and x represents a value of low order four bits) so as to designate the mode 4 with high order bits.

The ID1 represents the contents of a character string that starts at the text 1. (80h) represents an album name/program name. (81h) represents the name of a performer, the name of a conductor, or the name of an orchestra. (82h) represents the name of a writer. (83h) represents the name of a composer. (84h) represents the name of an arranger. (85h) represents a message. (86h) represents a disc ID. (87h) represents a search keyword. (88h) represents a TOC. (89h) represents a second TOC. (8ah) represents a user. (8bh) represents a text. (8ch) represents a text 2. (8dh) represents a reserved code. (8eh) represents a reserved code. (8fh) represents a size.

Figure 11:
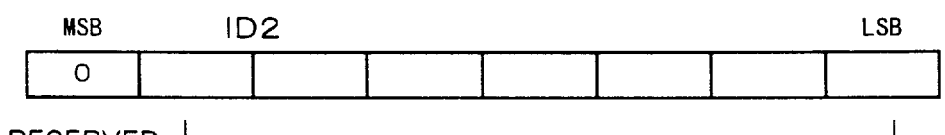
FIG. 11 is a schematic diagram showing a data structure of an ID2.

The ID2 represents a track of a character string that starts at the text position of the pack. As shown in FIG. 11, the ID2 represents a track number ranging from 1 to 99. Thus, other numeric values such as "0" and "100" (64h) or higher in the ID2 have special meanings. "00" represents the entire disc. The MSB of the ID2 is always "0". "1" of the MSB is used as an extension flag.

Figure 12:
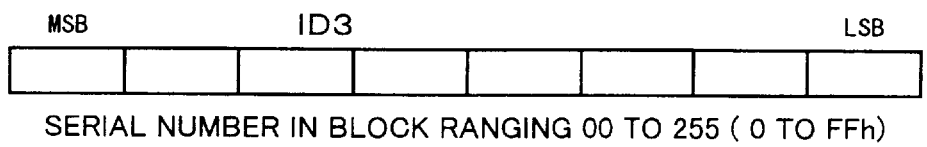
FIG. 12 is a schematic diagram showing a data structure of an ID3.

The ID3 represents a serial number assigned to the block. As shown in FIG. 12, a serial number of a block ranges from 00 to 255 (0 to FFh). When the ID3 is "0", it represents the first pack in the case that the ID1 is (80h). After the packs of which the ID1 is (80h) are completed, the ID1 becomes 81 and so forth. With additional information, when there is no pack with respect to the ID1, the next ID1 is used. However, packs are recorded in the ascending order of the value of the ID3.

Figure 13:
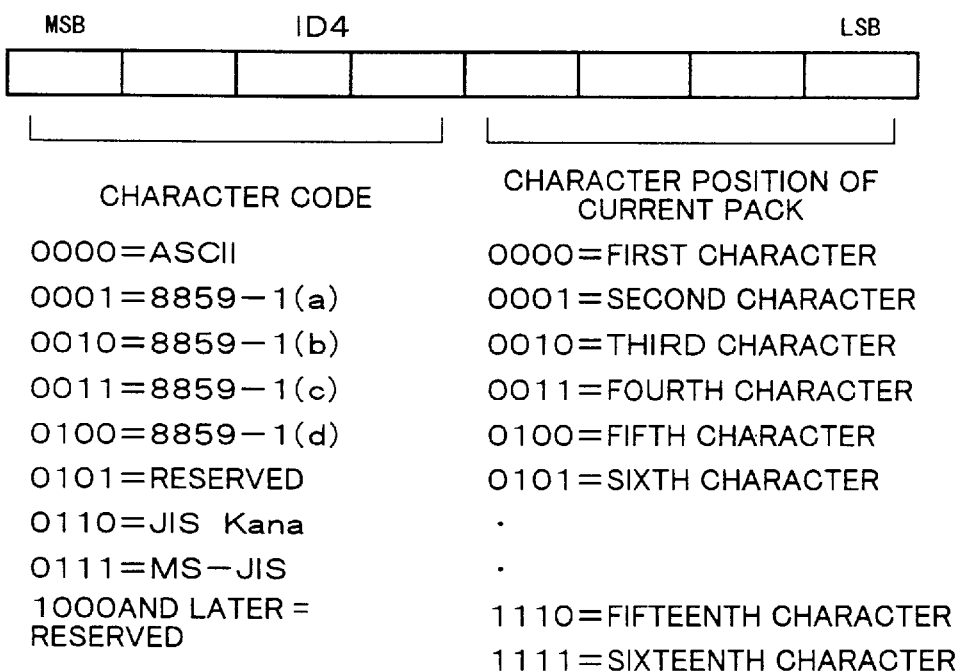
FIG. 13 is a schematic diagram showing types of identifiers recorded in the ID3.

The ID4 represents a character code of the current pack and the position of the character string thereof. As shown in FIG. 13, the first four bits of the ID4 represent a character code. "0000" represents an ASCII code. "0001", "0010", "10011", and "0100" represent 8859-1(a), 8859-1(b), 8859-1(c), and 8859-1(d) codes based on the ISO standard, respectively. "0101" represents a reserved code. "10110" represents a JIS Kana code. "0111" represents an MS-JIS code. "1000" and later represent reversed codes. The low order four bits of the ID4 represent the character position of the character of the text 1 of the current pack. "0000" represents a first character. "0001" represents a second character. "0010" represents a third character. "0011", "0100", and so forth represent a fourth character, a fifth character, and so forth, respectively.

Figure 14:
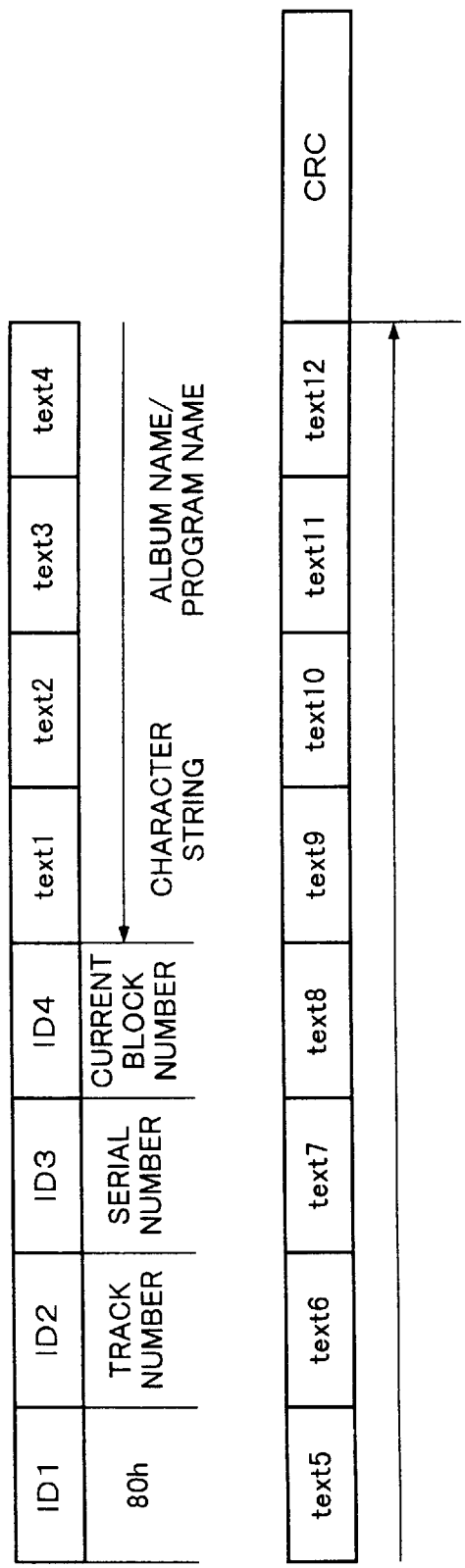
FIG. 14 is a schematic diagram showing the contents of data in the case that an album title or a program name is assigned to the ID1 as an identifier.

FIG. 14 is a schematic diagram showing an example of a structure of a pack in the case that the ID1 is (80h). When the ID1 is (80h), an album name and up to 99 program names are recorded. The last character of character information ends with null (00h). The null is followed by the next program name. FIGS. 15A to 15D show an example of which an album title is "BEATLES THE BEST", a first program name is "LOVE ME DO", a second program name is "THE WAVE", and a third program name is "PLEASE HELP".

FIG. 15A shows the contents of the first pack. In the first pack, the ID1 is (80h) that represents an album title. The ID2 is (0h) that represents the entire disc. The ID3 is (0h) that represents a first pack. The ID4 is (00h) that represents an ASCII code and that the number of characters displayed with the preceding pack is 0. The text1 to text12 are 12 characters "BEATLES THE". The remaining nine character of the album name(namely, "BEST") are contained in the second pack.

FIG. 15B shows the contents of the second pack. In the second pack, the ID1 is (80h) that represents an album title. The ID2 is (00h) that represents the entire disc. The ID3 is (01h) that represents the second pack. The ID4 is (0Ch) that represents an ASCII code and that the number of characters displayed with the preceding pack is 12. The text1 to text12 are four characters "BEST" that represents the remaining character of the album title, a null code that represents the end of the album title, and seven characters "LOVE ME" that represents the first portion of the first program name. The remaining characters of the first program name are contained in the third pack.

FIG. 15C shows the contents of the third pack. In FIG. 15C, the ID1 is (80h) that represents a program name. The ID2 is (00h) that represents that first character in the third pack is a part of the first program name. The ID3 is (02h) that represents the third pack. The ID4 is (07h) that represents an ASCII code and that the number of characters displayed with the preceding pack (second pack) is seven. The text1 to text12 are three characters "DO" that represents the remaining characters of the first program name, a null code that represents the end of the first program name, and eight characters "THE WAVE" that represent the the second program name.

FIG. 15D shows the contents of the fourth pack. The ID1 is (80h) that represents a program name. The ID2 is (03h) that represents that the first character of the fourth pack is a part of the third program name. The ID3 is (03h) that represents the fourth pack. The ID4 is (00h) that represents an ASCII code and that the number of characters displayed with the preceding pack (third pack) is 0. The text1 to text12 are 11 characters "PLEASE HELP" that represent the third program name and a null code that represents the end of the third program name.

Figure 16:
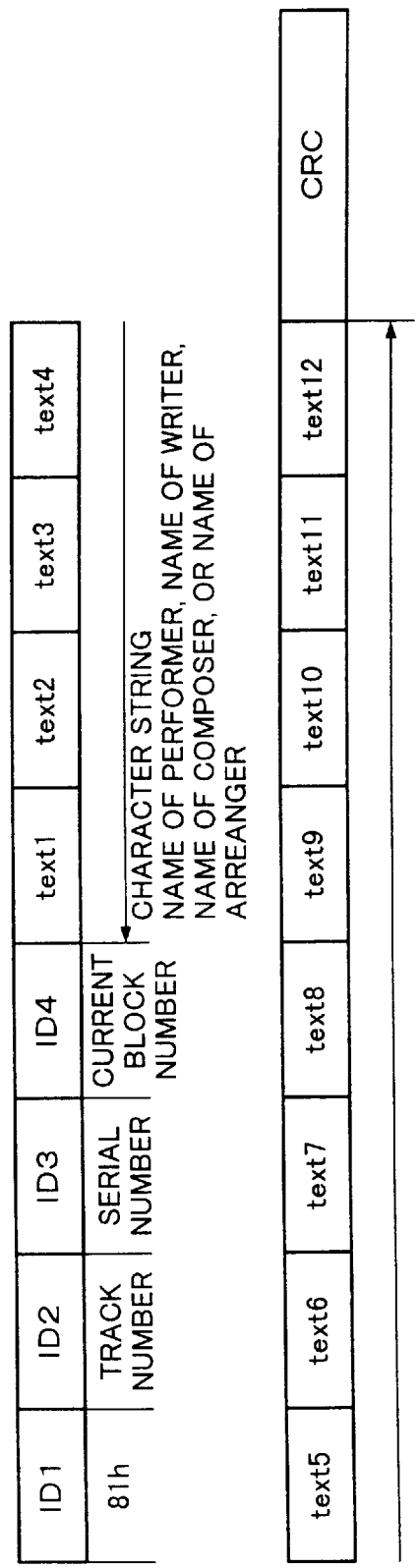
FIG. 16 is a schematic diagram showing the contents of data in the case that a person who contributed to the creation of an album such as a performer is assigned to the ID1 as an identifier.

FIG. 16 is a schematic diagram showing an example of a structure of a pack in the case that ID1 is (85h). When the ID1 is (81h), the name of a person with respect to an album name or a program name (for example, the name of a performer, the name of a conductor, or the name of a orchestra) is recorded. As shown in FIGS. 17A to 17C, individual names are delimited with null (00h) and successively recorded. FIGS. 17A to 17C shows an example of which the name of the performer representative of the album is "MICHEL JACKSON", the name of the performer of the first program is "JANET JACKSON", and the name of the performer of the second program is "M. JACK . . .".

Figure 18:
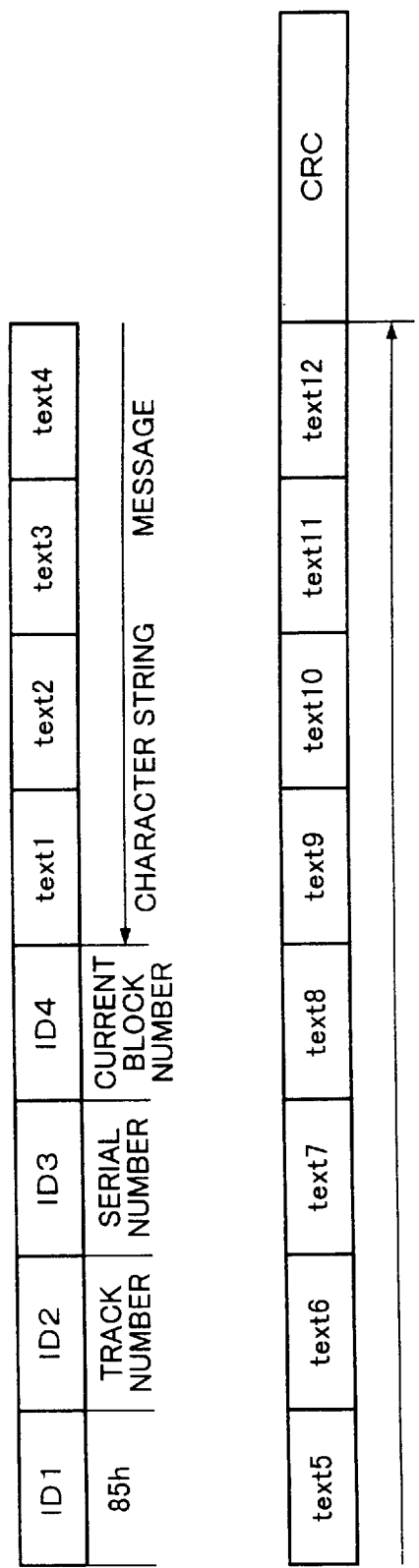
FIG. 18 is a schematic diagram showing the contents of data in the case that a message is assigned to the ID1 as an identifier.

FIG. 18 is a schematic diagram showing an example of a structure of a pack in the case that ID1 is (85h) . When the ID1 of the pack is (85h), as with the name of an album and the name of a program, a message for each program is recorded. As shown n FIGS. 19A to 19D, the ID2 represents a track number ranging from 1 to 63. When the value of the ID2 is out of the range, it has a special meaning. When the ID2 is (00h), it represents a message representative of the album. When the ID2 is in the range from (70h) to (70h), it represents that the message has been recorded in predetermined languages. (70h) represents German. (71h) represents French. (72h) represents Spanish. (73h) represents Italian. (74h) represents Dutch. (75h) represents Russian. (78h) represents Chinese. (79h) represents Japanese. (7ah) represents Korean or the like. FIGS. 19A, 19B, and 19C show an example in the case that a message "Thank You Very much Please Enjoy" has been recorded on packs of the CD. FIG.

19D shows an example in the case that a message "See You Bye" has been recorded at the fifteenth program on the CD. The fifteenth program can be detected by decoding the ID2 that is (0fh) shown in FIG. 19D.

Figure 20:
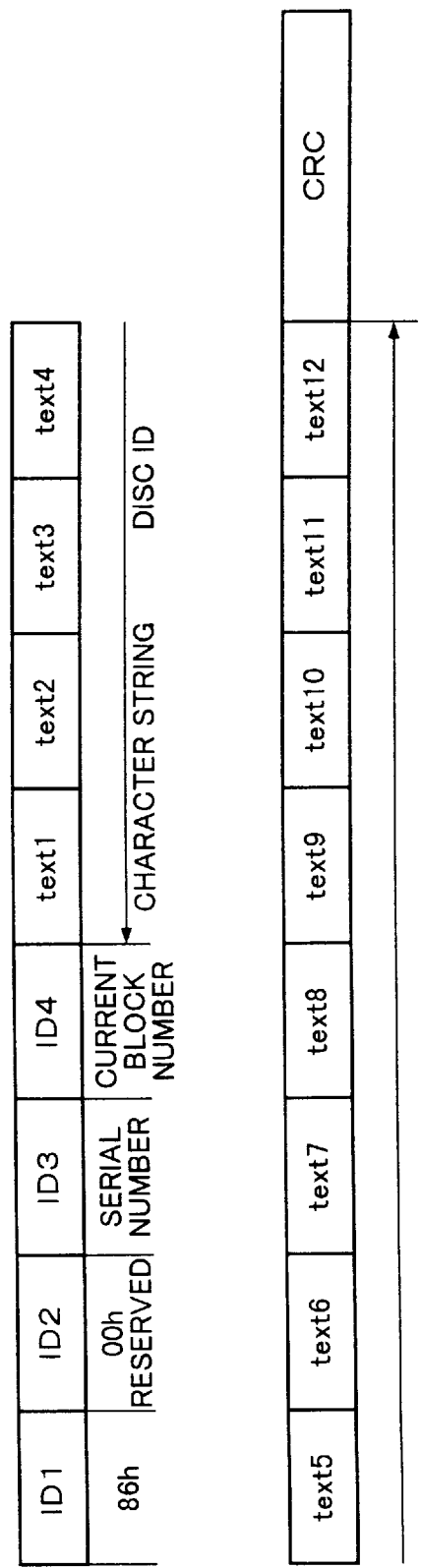
FIG. 20 is a schematic diagram showing the contents of data in the case that a disc ID is assigned to the ID1 as an identifier.

FIG. 20 is a schematic diagram showing an example of a structure of a pack in the case that ID1 is (86h). When the ID1 is (86h), it represents a disc ID. However, besides an ID code, the name of the seller, a POS (Point Of Sales) code, the published year, and so forth may be recorded.

Figure 21:
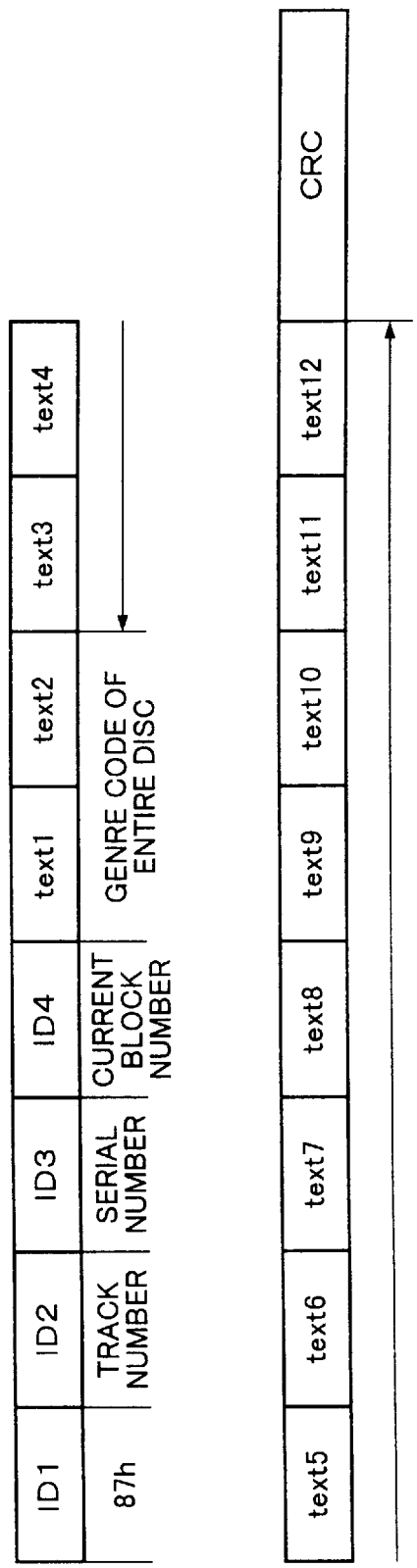
FIG. 21 is a schematic diagram showing the contents of data in the case that a search ID is assigned to the ID1 as an identifier.
Figure 22A:
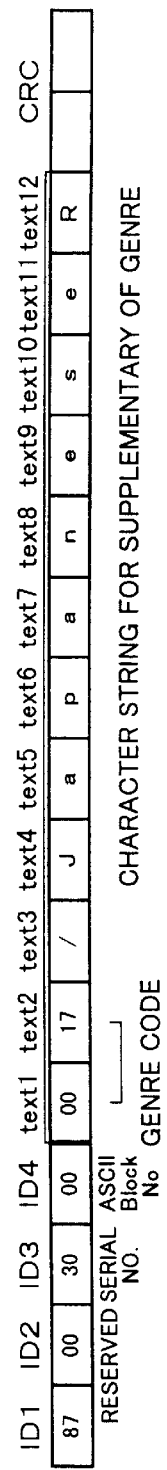
FIG. 22A is a schematic diagram showing a practical data structure in the case that a search ID is assigned to the ID1 as an identifier.
Figure 22B:
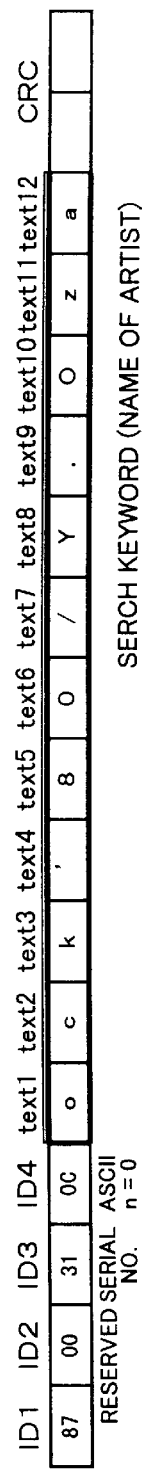
FIG. 22B is a schematic diagram showing a practical data structure in the case that a search ID is assigned to the ID1 as an identifier.
Figure 22C:
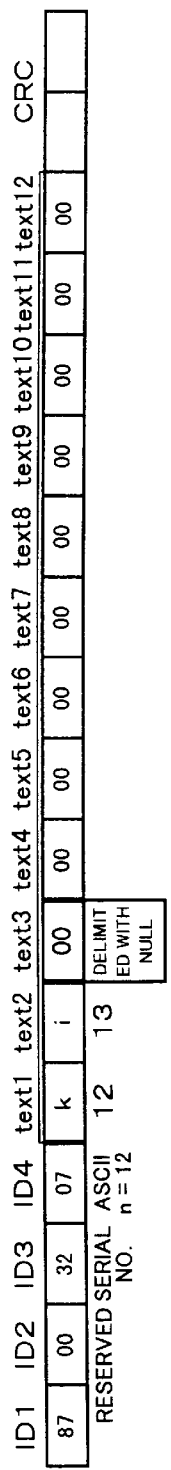
FIG. 22C is a schematic diagram showing a practical data structure in the case that a search ID is assigned to the ID1 as an identifier.

FIG. 21 is a schematic diagram showing an example of a structure of a pack in the case that ID1 is (87h). When the ID1 is 87h, a search keyword is recorded. The search ID is composed of a 2-byte genre code and the name of a person representative of the entire disc or a keyword. When the entire genre code cannot be fully recorded in the pack, the remaining code may be recorded in the text3 or later. FIGS. 22A to 22C show an example in the case that record genre codes are "00" and "17", a genre supplementary character string is "Japanese Rock' 80", and a search keyword is "Y. Ozaki".

FIGS. 23A and 23B are schematic diagrams showing examples of a structure of packs in the case that ID1 is (88h). In addition, FIG. 23A shows the case that ID2 is (00h). When the ID1 is (88h), a TOC (Table Of Contents) is recorded. In this embodiment, information of channels R to W of the conventional TOC information is recorded. On the other hand, FIG. 23B shows the case that ID2 is in the range from (01h) to (63h).

FIG. 24 is a schematic diagram showing an example of a structure of a pack in the case that ID1 is (89h). When the ID1 is (89h), a second TOC is recorded. The second TOC is a special portion that cannot be represented with the conventional TOC. In this example, the second TOC is used to represent the most impressive portion (genre information) in a program such as a highlight or climax portion. The text1 represents a priority. When the text1 is (00h), it represents the highest priority. When the text1 is (01h), it represents the next highest priority. When the text1 is (FFh), it represents the lowest priority. The text2 represents the total number of points. It is preferred to have three points for each disc. The text3 to text6 are reserved. The text7, text8, and text9 represent the start address of a digest. The text10, text11, and text12 represent the end address of the digest. These addresses are, for example, absolute time information of the CD. Individual bytes of the texts represent a minute (ranging from 00 to 74), a second (ranging from 00 to 59), and a frame (ranging from 00 to 74).

Figures 25A, 25B, 25C:
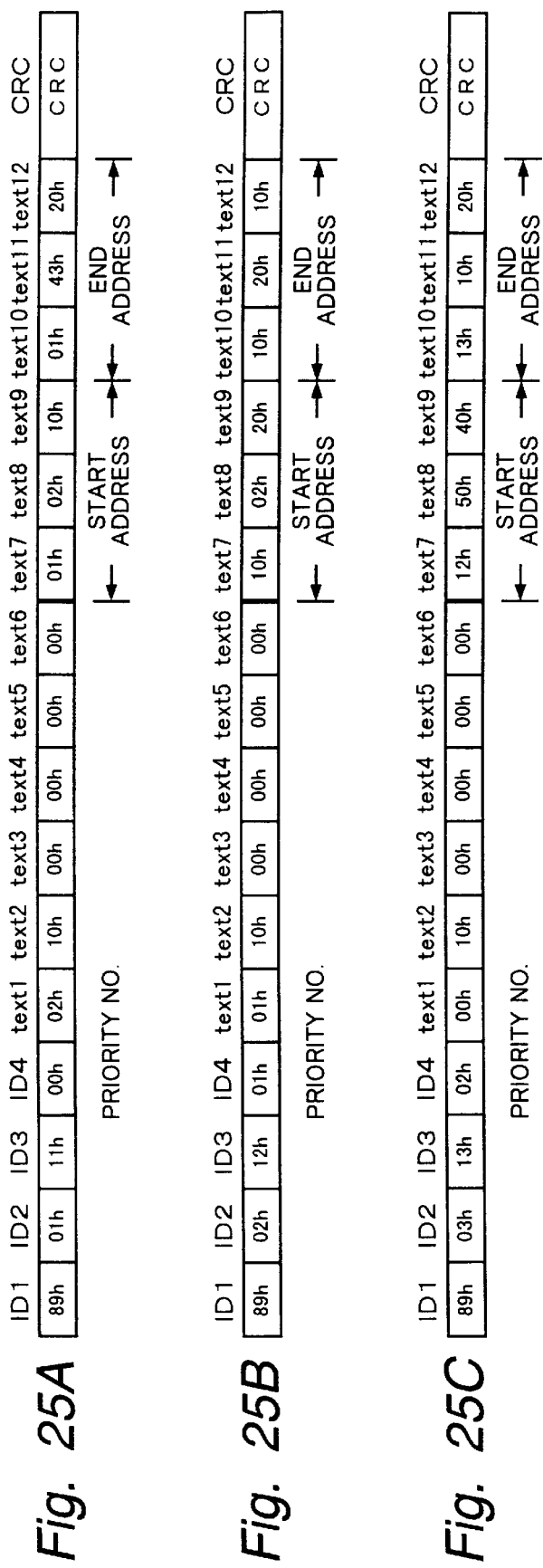
FIG. 25A is a schematic diagram showing a practical data structure in the case that a digest reproduction is assigned to the ID1 as an identifier.
FIG. 25B is a schematic diagram showing a practical data structure in the case that a digest reproduction is assigned to the ID1 as an identifier.
FIG. 25C is a schematic diagram showing a practical data structure in the case that a digest reproduction is assigned to the ID1 as an identifier.

As shown in FIG. 25A, the ID1 of the pack is (89h) that represents a digest. The ID2 is (01h) that represents the program number of which the digest is reproduced. The ID3 is (11h) that represents a serial number. The ID4 is (00h) that represents a current block number. The text1 is (00h) that represents the priority of programs in which digest points have been designated. The text2 is (10h) that represents the number of digest points (in this case, three digest points have been designated). The text3 to text6 are reserved. The text7, text8, and text9 are (01h), (02h), and (10h) that represent 1 minute, 2 seconds, and 10 frames, respectively, as the start address of a digest point. The text10, text11, and text12 are (01h), (43h), and (20h) that represent 1 minute, 43 seconds, and 20 frames, respectively, as the end address of the digest point.

FIG. 25B shows the second pack. The ID1 is (89h) that represents a pack for a digest. The ID2 is (02h) that represents a program number of which the digest has been designated. The ID3 is (12h) that represents a serial number. The ID4 is (01h) that represents a current block number. The text1 is (01h) that represents the second highest priority in programs of which digest points have been designated. The text2 is (10h) that represents that three digest points have been recorded on the disc. The text3 to text6 are reserved. The text7, text8, and text9 are (10h), (02h), and (20h) that represent 10 minutes, 2 seconds, and 20 frames, respectively, as the start address of the digest point. The text10, text11, and text12 are (10h), (20h), and (10h) that represent 10 minutes, 20 seconds, and 10 frames, respectively, as the end address of the digest point.

FIG. 25C shows the third pack. The ID1 is (89h) that represents a pack for a digest. The ID2 is (03h) that represents a program number of which the digest reproduction has been designated. The ID3 is (13h) that represents the serial number of the pack. The ID4 is (02h) that represents the current block number. The text1 is (00h) that represents the highest priority number in programs of which digest points have been designated. The text2 is (10h) that represents that three digest points have been recorded on the disc. The text3 to text6 are reserved. The text7, text8, and text9 are (12h), (50h), and (40h) that represent 12 minutes, 50 seconds, and 40 frames, respectively, as the start address of the digest point. The text10, text11, and text12 are (13h), (10h), and (20h) that represent 13 minutes, 10 seconds, and 20 frames, respectively, as the end address of the digest point. The start address and end address are absolute addresses counted from the beginning of the program. The start address and the end address are recorded as absolute time.

FIGS. 26A and 26B are schematic diagrams showing an example of the structures of packs in the case that ID1 is (8fh). When the ID1 is (8fh), a size is recorded. The size represents the number of packs of one block. The size is composed of two packs shown in FIGS. 26A and 26B.

As described above, for example, a CD as the record medium according to the present invention records data such that 24 symbols each of which is composed of six bits of channels R to W of sub-codes recorded in the TOC region are grouped as one pack and every four packs are grouped as one packet. Mode information for designating a record mode of information of each pack is recorded at the top position of the pack. Each pack has identification information and text information or digest information, each of which is composed of a multiple of eight bits.

FIG. 27 shows an example of a reproducing apparatus that reproduces data from such a CD. In this example, the reproducing apparatus has an automatic changer function for selecting one of a plurality of CDs so as to reproduce data from the selected CD. A CD 41 selected by the changer function is rotationally driven by a spindle motor 43. Data recorded from the CD 41 is read by an optical pickup 42. A signal obtained by the optical pickup 42 is supplied to a signal processing circuit 45 through an RF signal processing circuit 44. The signal processing circuit 45 digitally processes the signal received from the optical pickup 42. A component of a digital audio signal received from the signal processing circuit 45 is supplied to an D/A converter 47. The D/A converter 47 converts the digital audio signal into an analog audio signal. The analog audio signal is output from an analog audio signal output terminal. The audio data is processed in the same manner as the conventional CD player.

The CD reproducing apparatus shown in FIG. 27 comprises a sub-code separating circuit 51, a disc identifying circuit 66, a sub-code processing circuit 54, and a character display portion 58. The sub-code separating circuit 51 separates data of channel Q and data of channels R to W from sub-codes received from the signal processing circuit 45. The disc identifying circuit 66 obtains mode information of the sub-code of channels R to W being separated and identifies the type of the record medium corresponding to the mode information. The sub-code processing circuit 54 processes the sub-code of channels R to W received from the sub-code separating circuit 51 corresponding to the output data of the disc identifying circuit 66. The character display portion 58 displays text information portion of information processed by the sub-code processing circuit 54.

The sub-code separating circuit 51 separates data of channel Q and data of channels R to W from sub-codes. The sub-code of channel Q is supplied to a time information processing circuit 52. The sub-code of channels R to W is supplied to the sub-code processing circuit 54 and the disc identifying circuit 66. The time information processing circuit 52 supplies time information managed by on channel Q to a time display portion 53. The time display portion 53 displays the time information.

The disc identifying circuit 66 extracts the mode information on channels R to W and identifies the type of the CD corresponding to the mode information. In other words, for the CD being loaded, the disc identifying circuit 66 identifies whether or not identification information and text information (or digest information) have been recorded on channels R to W. When the identification and text information (or digest information) have been recorded on channels R to W, an operation input signal is output to the sub-code processing circuit 54. When the CD being loaded is other than the above-described CD (in particular, graphics information has been recorded on channels R to W), an operation input signal is output to a graphics processing circuit 48.

When the identification information and text information (or digest information) have been recorded on channels R to W, the sub-code processing circuit 54 receives the operation input signal from the disc identifying circuit 66. The data of channels R to W received from the sub-code separating circuit 51 is processed corresponding to a predetermined conversion code such as an ASCII code. Thus, for example genre information 55a, ID information 55b, digest information address 55c, character information 55d (such as an album name and a performer name), and size information 55e are extracted and individually stored.

The character information 55d separated by the sub-code processing circuit 54 is sent to a character contents separating circuit 57. Display items and contents of the character information 55d are selected corresponding to the operation of a display selection switch 56. The selected information is sent to the character display portion 58. The character display portion 58 displays the selected information.

The genre information 55a separated by the sub-code processing circuit 54 is supplied to a controlling circuit 60 that has a so-called CPU or the like. The controlling circuit 60 controls the apparatus so that programs of a disc designated by the user or a program designated by the user is reproduced. The controlling circuit 60 is connected to a RAM 61. When the user operates a genre switch of an operating portion 62, genre information designated by the user is stored in the RAM 61. The controlling portion 60 determines whether or not the genre information designated by the user accords with the genre information 55a received from the sub-code processing circuit 54. Only when they accord with each other, the controlling portion 60 controls a servo circuit 65 so as to reproduce designated data from the CD. In the automatic changer type apparatus, discs are automatically changed so as to reproduce data from a disc corresponding to a genre designated by the user.

The ID information 55b received from the sub-code processing circuit 54 is supplied to the controlling circuit 60 so as to effectively operate the automatic changer mechanism. The digest information address (start address and end address) 55c is recorded for each program and each digest. The address is read by the controlling circuit 60 so as to reproduce the digest.

The size information 55e received from the sub-code processing circuit 54 is supplied to a TOC read wait time calculating circuit 64. The TOC read wait time calculating circuit 64 calculates read time (namely, wait time) necessary for reading a sub-code of channels R to W corresponding to sub Q error information 63 that represents whether or not data of channel Q has been correctly read by the signal processing circuit 45 and supplies the wait time to a time display portion 58. The character display portion 58 may display the wait time.

When the loaded CD has a data structure as shown in FIGS. 8A, 8B, and 9 and contains graphics code including image information and character code having a predetermined bit pattern corresponding to characters, the graphics processing circuit 48 receives the operation input signal from the disc identifying circuit 66, processes the graphics code and character code, and generates display data. The graphics display circuit 49 generates a display signal with the display data received from the graphics processing circuit 48. The display signal is output from a graphics output terminal.

Figure 28:
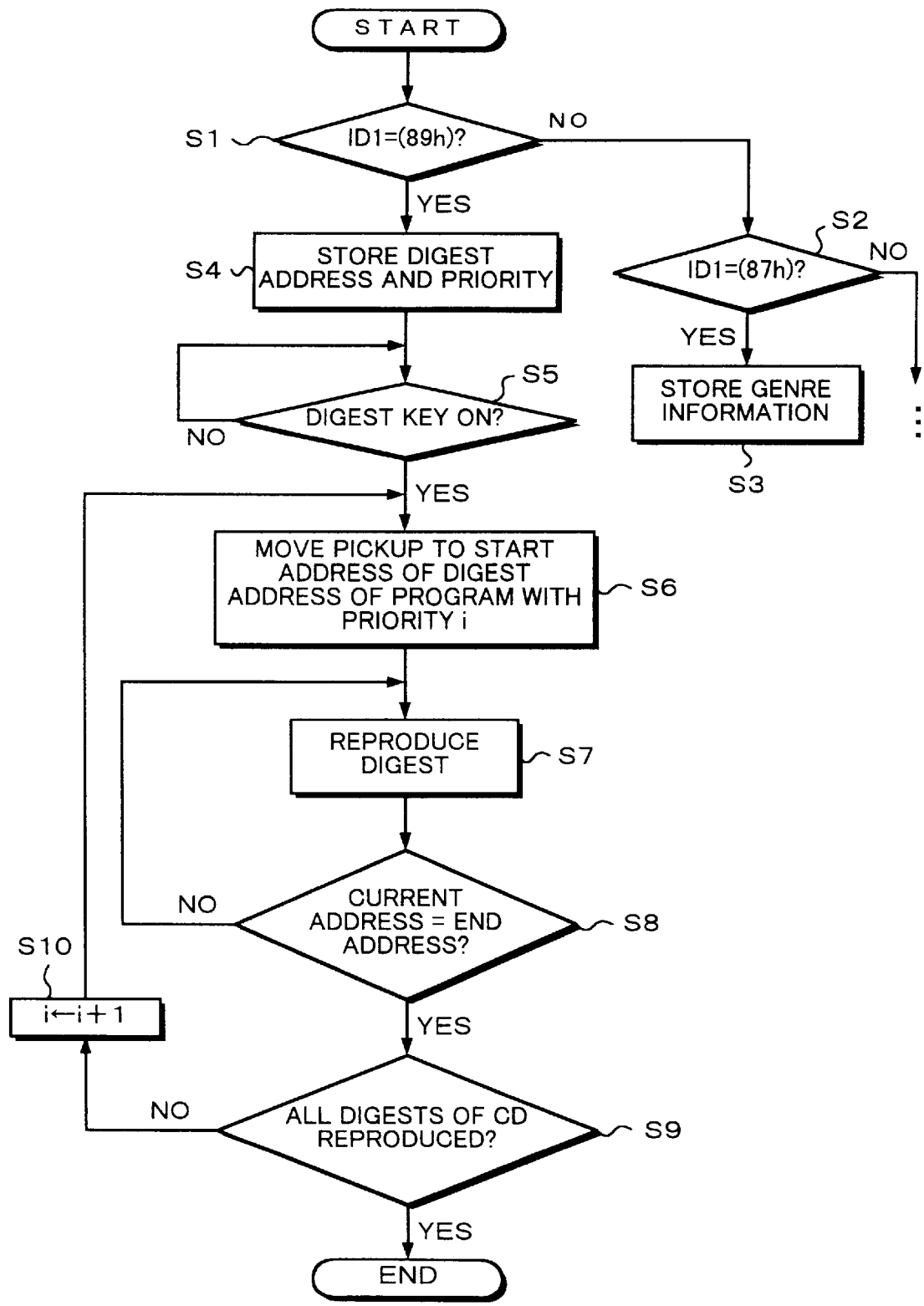
FIG. 28 is a flow chart for accomplishing the digest reproduction according to the present invention.

FIG. 28 is a flow chart showing an outline of a digest reproducing operation as a feature of the present invention. When the flow shown in FIG. 28 starts, the CD 41 is loaded. The TOC data is read from the CD 41. The sub-code separating circuit 51 separates a sub-code of channel Q and a sub-code of channels R to W. The disc identifying circuit 66 has determined that text information or digest information has been recorded as the TOC data on the CD 41. It is determined whether ID1 is (89h) at step S1.

When the determined result at step S1 is No, the flow advances to step S2. At step S2, it is determined whether or not ID1 is (87h). When the determined result at step S2 is Yes, the genre information 55a of the pack is stored (at step S3). When the determined result at step S2 is No, it is determined whether or not ID1 is other than (87h) (not shown). Corresponding to the value of ID1, the character information 55d is stored.

When the determined result at step S1 is Yes, the flow advances to step S4. At step S4, the digest information address and the priority 55c are stored. The digest information address is stored as a table that has the names of programs on the CD 41, their digests, their start addresses, and their end addresses.

At step S5, it is determined whether or not a digest key of the operating portion 62 has been turned on. When the determined result at step S5 is Yes, the controlling circuit 60 controls the servo circuit 65 so as to successively move the read spot to the start address of the digest of an i-th program with the higher priority (namely, the program start position is detected) (at step S6). After the start position detecting operation has been completed, the digest is reproduced from the start address (at step S7). At step S8, it is determined whether or not the current address of the digest being reproduced accords with the end address thereof. When the determined result at step S8 is Yes, the flow advances to step S9. At step S9, it is determined whether or not all the digests of the CD have been reproduced. When the determined result at step S8 is Yes, the digest reproducing operation is completed. To detect the completion of the digest reproducing operation, a flag or code that represents it is stored at the address immediately following the last digest address information of the table. When the determined result at step S9 is No, the flow advances to step S10. At step S10, the priority value i increments by 1 and the flow returns to step S6.

In the above-described embodiment, the TOC of the CD is the program management region. When the medium is a magnetic tape, the program management region is recorded at the start portion of the tape. In other words, the position of the program management region varies depending on the type of the record medium. Moreover, in the above-described embodiment, text information is recorded as a sub-code. However, it is not necessary to record text information along with regular data. Furthermore, the present invention can be applied to not only a read-only record medium such as a CD, but also to a writable record medium and a record medium that has both a read-only region and a writable region.

As described above, according to a record medium of the present invention, feature or impressive portion such as highlight or climax portion of each program can be recorded as digest information. With addresses recorded as digest information and information for managing priority, feature or impressive portion of each program can be reproduced corresponding to the priority. Thus, the contents of individual programs recorded on the record medium can be quickly and properly obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A record medium, comprising:
    a program region in which at least one program is recorded; and
    a management region in which management information is recorded, the management information managing the number of programs recorded in the program region, the record positions of the programs, and the position of digest information of at least one program recorded in the program region.

2. The record medium as set forth in claim 1,
    wherein the management region manages a plurality of items of additional information and identifiers that represent the types of the items of additional information.

3. The record medium as set forth in claim 2,
    wherein when the additional information manages the position of the digest information of at least one program, the additional information manages the number of programs of which digests have been designated.

4. The record medium as set forth in claim 2,
    wherein when the additional information manages the position of the digest information of at least one program, the additional information manages priority information that represents the priority of a plurality of items of digest information being designated.

5. A reproducing apparatus for reproducing data from a record medium having a program region in which at least one program is recorded and a management region in which management information is recorded, the management information managing the number of programs recorded in the program region, the record positions of the programs, and the position of digest information of at least one program recorded in the program region, the reproducing apparatus comprising:
    reproducing means for reproducing a management information and a program recorded on a record medium;
    extracting means for extracting a position information of a digest information of the program from the management information;
    operating means for designating a digest reproduction; and
    controlling means for controlling the reproducing means so as to successively reproduce programs recorded in the program region corresponding to the position information extracted from the extracting means when the operating means designates the digest reproduction.

6. The reproducing apparatus as set forth in claim 5,
    wherein a plurality of items of additional information and identifiers that represent the types of the items of additional information are managed in the management region of the record medium, the reproducing apparatus further comprising:
    determining means for determining whether or not the additional information is position information of digest information of the programs,
        wherein when the determining means has determined that the additional information is the position information of the digest information, the reproducing means is controlled corresponding to the position information.

7. The reproducing apparatus as set forth in claim 5,
    wherein the management information manages the number of programs of which digests have been designated and priority information that represents the priority of the programs,
    wherein the extracting means extracts the priority information that represents the priority of the programs corresponding to the management information, and further
    wherein the reproducing apparatus further comprises controlling means for successively reproducing programs recorded in the program region corresponding to the position information extracted by the extracting means and the priority information when the operating means has designated the digest reproduction.

8. The apparatus of claim 5 further including selection means for selecting said record medium for reproducing said management information and said program recorded on said record medium by said reproducing means.

9. A reproducing method for reproducing data from a record medium having a program region in which at least one program is recorded and a management region in which management information is recorded, the management information managing the number of programs recorded in the program region, the record positions of the programs, and the position of digest information of at least one program recorded in the program region, the reproducing method comprising the steps of:
    (a) reproducing a management information and a program recorded on a record medium;
    (b) extracting an identifier from the management information reproduced at step (a) and determining whether or not a digest information is managed;

(c) if the digest information is managed as the determined result at step (b), extracting the position from the management information and storing the extracted position;

(d) determining whether or not a digest reproduction has been reproduced; and (e) if the digest reproduction has been designated at step (d), successively reproducing programs recorded in the program region corresponding to the position information being stored.

10. The reproducing method as set forth in claim 9, wherein the management information manages the number of programs of which the digest reproduction has been designated and priority information that represents the priority of the designated programs, the reproducing method further comprising the steps of:
extracting priority information that represents the priority of the programs from the management information; and successively reproducing the programs recorded in the program region corresponding to the extracted position information and the priority information.

11. A method of reproducing data from a record medium having a program region in which at least one program is recorded and a management region in which management information is recorded, the management information managing the number of programs recorded in the program region, the record positions of the programs, and the position of digest information of at least one program recorded in the program region, the method comprising the steps of:

reproducing a management information and a program recorded on a record medium;

extracting a position information of a digest information of the program from the management information;

designating a digest reproduction; and successively producing programs recorded in the program region corresponding to the position information extracted from the extracting means when the designating means designates the digest reproduction.

12. The reproducing method of claim 11 wherein a plurality of items of additional information and identifiers that represent the types of the items of additional information are managed in the management region of the record medium, the method further including the step of determining whether or not the additional information is position information of digest information of the programs, wherein when the additional information is determined to be the position information of the digest information, the controlling the reproducing step to correspond to the position information.

13. The method of claim 11 wherein the management information manages the number of programs of which digests have been designated and priority information that represents the priority of the programs, wherein the step of extracting includes extracting the priority information that represents the priority of the programs corresponding to the management information, and wherein the method further including the step of successively reproducing programs recorded in the program region corresponding to the position information extracted by the extracting means and the priority information when the operating means has designated the digest reproduction.

* * * * *